(12) United States Patent
Wu

(10) Patent No.: US 11,102,667 B2
(45) Date of Patent: Aug. 24, 2021

(54) DEVICE AND METHOD OF HANDLING WIRELESS LOCAL AREA NETWORK MEASUREMENT CONFIGURATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 43 days.

(21) Appl. No.: 15/224,673

(22) Filed: Aug. 1, 2016

(65) Prior Publication Data

US 2017/0041819 A1 Feb. 9, 2017

Related U.S. Application Data

(60) Provisional application No. 62/200,132, filed on Aug. 3, 2015.

(51) Int. Cl.
*H04W 24/10* (2009.01)
*H04W 76/19* (2018.01)
(Continued)

(52) U.S. Cl.
CPC .............. *H04W 24/10* (2013.01); *H04L 1/00* (2013.01); *H04W 24/08* (2013.01);
(Continued)

(58) Field of Classification Search
CPC ... H04W 24/10; H04W 24/08; H04W 76/021; H04W 76/028; H04W 36/0066; H04W 84/12; H04W 76/04
See application file for complete search history.

(56) References Cited

U.S. PATENT DOCUMENTS

2006/0039341 A1 2/2006 Ptasinski
2012/0009918 A1* 1/2012 Wu .................. H04W 24/10
455/423

(Continued)

FOREIGN PATENT DOCUMENTS

CN 103999507 A 8/2014
CN 104581812 A 4/2015

OTHER PUBLICATIONS

U.S. Appl. No. 62/056,074, "Enhancements To Load Reporting From a Wireless Local-Area Network to an LTE Network", Sep. 26, 2014.*

(Continued)

*Primary Examiner* — Thinh D Tran
(74) *Attorney, Agent, or Firm* — Winston Hsu

(57) ABSTRACT

A communication device of handling a wireless local area network (WLAN) measurement configuration comprises instructions of establishing a connection to a base station (BS) of a cellular network; receiving the WLAN measurement configuration on the connection from the BS; performing WLAN measurement on a WLAN according to the WLAN measurement configuration; transmitting a first WLAN measurement result of the WLAN measurement on the connection to the BS according to the WLAN measurement configuration; receiving a cellular-WLAN aggregation (CWA) configuration on the connection from the BS; communicating a plurality of packets with the WLAN according to the CWA configuration; keeping the WLAN measurement configuration, when detecting a connection failure on the WLAN; and releasing the WLAN measurement configuration, when detecting a connection failure on the cellular network.

13 Claims, 5 Drawing Sheets

(51) Int. Cl.
  *H04W 76/11* (2018.01)
  *H04W 36/00* (2009.01)
  *H04L 1/00* (2006.01)
  *H04W 76/16* (2018.01)
  *H04W 24/08* (2009.01)
  *H04W 76/20* (2018.01)
  *H04W 76/18* (2018.01)
  *H04W 76/25* (2018.01)
  *H04W 84/12* (2009.01)

(52) U.S. Cl.
  CPC ........ *H04W 36/0066* (2013.01); *H04W 76/11* (2018.02); *H04W 76/16* (2018.02); *H04W 76/19* (2018.02); *H04W 76/18* (2018.02); *H04W 76/20* (2018.02); *H04W 76/25* (2018.02); *H04W 84/12* (2013.01)

(56) References Cited

U.S. PATENT DOCUMENTS

| | | | | |
|---|---|---|---|---|
| 2013/0039338 | A1* | 2/2013 | Suzuki | H04W 36/0094 370/331 |
| 2014/0079022 | A1 | 3/2014 | Wang | |
| 2014/0092771 | A1* | 4/2014 | Siomina | H04W 24/08 370/252 |
| 2015/0043373 | A1 | 2/2015 | Wu | |
| 2015/0109927 | A1* | 4/2015 | Ozturk | H04W 36/0027 370/235 |
| 2015/0156636 | A1 | 6/2015 | Tabet | |
| 2016/0295466 | A1* | 10/2016 | da Silva | H04W 12/06 |
| 2016/0353512 | A1* | 12/2016 | Lu | H04W 52/0209 |
| 2017/0135151 | A1* | 5/2017 | Fujishiro | H04W 76/064 |
| 2017/0215105 | A1* | 7/2017 | Tan Bergstrom | H04W 48/18 |

OTHER PUBLICATIONS

3GPP TS 36.331 V12.6.0 (Jun. 2015), 3rd Generation Partnership Project; Technical Specification Group Radio Access Network; Evolved Universal Terrestrial Radio Access (E-UTRA); Radio Resource Control (RRC); Protocol specification (Release 12), XP050986363, pp. 1-449.*

3GPP TS 36.300 V12.6.0 (Jun. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

3GPP TS 36.331 V12.6.0 (Jun. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TSG-RAN2 Meeting 89-bis R2-152922 Bratislava, Slovakia, Apr. 20-24, 2015 CR-Form-v11.1 Change Request 36.300 CR CRNum rev—Current version: 12.5.0.

Search Report dated Sep. 29, 2017 for EP application No. 17186451.5, pp. 1-17.

Ericsson, "Dedicated RAN assistance parameter handling", 3GPP TSG-RAN WG2 #87bis, Tdoc R2-144200, Oct. 6-10, 2014, Shanghai, China, XP050876452, pp. 1-2.

3GPP TR 37.834 V12.0.0 (Dec. 2013), 3rd Generation Partnership Project; Technical Specification Group Radio Access Network; Study on Wireless Local Area Network (WLAN)—3GPP radio interworking (Release 12), XP050729404, pp. 1-17.

Intel Corporation, China Telecom, Qualcomm Incorporated, "Agreements on LTE-WLAN Radio Level Integration and Interworking Enhancement", 3GPP TSG-RAN2 Meeting 89-bis, R2-152922, Apr. 20-24, 2015, Bratislava, Slovakia, XP050984079.

LG Electronics Inc., "Traffic steering command for WLAN interworking enhancement", 3GPP TSG-RAN WG2 #90, R2-152732, May 25-29, 2015, Fukuoka, Japan, XP050974005, pp. 1-3.

Office action dated Oct. 20, 2017 for the Taiwan application No. 105124382, filing date Aug. 2, 2016, p. 1-20.

Search Report dated Jun. 16, 2017 for EP application No. 16182370.3, pp. 1-25.

Office action dated Feb. 27, 2019 for the China application No. 201610629226.7, filing date Aug. 3, 2016, p. 1-11.

Office action dated Oct. 29, 2019 for IN application No. 201644026344, filing date: Aug. 2, 2016, coverpage & pp. 1-6.

* cited by examiner

DEVICE AND METHOD OF HANDLING WIRELESS LOCAL AREA NETWORK MEASUREMENT CONFIGURATION

CROSS REFERENCE TO RELATED APPLICATIONS

This application claims the benefit of U.S. Provisional Application No. 62/200,132, filed on Aug. 3, 2015, which is incorporated herein by reference.

BACKGROUND OF THE INVENTION

1. Field of the Invention

The present invention relates to a communication device and a method used in a wireless communication system, and more particularly, to a communication device and method of handling a wireless local area network measurement configuration in a wireless communication system.

2. Description of the Prior Art

Long term evolution (LTE)-wireless local area network (WLAN) aggregation is used for increasing data rate. An evolved Node-B (eNB) configures a WLAN measurement configuration to a user equipment (UE) for the LTE-WLAN aggregation. The UE transmits a WLAN measurement report to the eNB according to the WLAN measurement configuration. The eNB configures the UE to perform the LTE-WLAN aggregation according to the WLAN measurement report. However, it is unknown how the UE handles the WLAN measurement configuration, when detecting a LTE connection failure or a WLAN connection failure.

Thus, how to handle the WLAN measurement configuration is an important problem to be solved.

SUMMARY OF THE INVENTION

The present invention therefore provides a method and related communication device for handling a wireless local area network measurement configuration to solve the above-mentioned problem.

A communication device of handling a wireless local area network (WLAN) measurement configuration comprises a storage unit for storing instructions and a processing means coupled to the storage unit. The processing means is configured to execute the instructions stored in the storage unit. The instructions comprise establishing a connection to a base station (BS) of a cellular network; receiving the WLAN measurement configuration on the connection from the BS; performing WLAN measurement on a WLAN according to the WLAN measurement configuration; transmitting a first WLAN measurement result of the WLAN measurement on the connection to the BS according to the WLAN measurement configuration; receiving a cellular-WLAN aggregation (CWA) configuration on the connection from the BS; communicating a plurality of packets with the WLAN according to the CWA configuration; keeping the WLAN measurement configuration, when detecting a connection failure on the WLAN; and releasing the WLAN measurement configuration, when detecting a connection failure on the cellular network.

A communication device of handling a wireless local area network (WLAN) measurement configuration comprises a storage unit for storing instructions and a processing means coupled to the storage unit. The processing means is configured to execute the instructions stored in the storage unit. The instructions comprise establishing a connection to a base station (BS) of a cellular network; receiving the WLAN measurement configuration on the connection from the BS; performing WLAN measurement on a WLAN according to the WLAN measurement configuration; transmitting a first WLAN measurement result of the WLAN measurement on the connection to the BS according to the WLAN measurement configuration; receiving a cellular-WLAN aggregation (CWA) configuration on the connection from the BS; communicating a plurality of packets with the WLAN according to the CWA configuration; releasing the WLAN measurement configuration, when detecting a connection failure on the WLAN; and releasing the WLAN measurement configuration, when detecting a connection failure on the cellular network.

A communication device of handling a wireless local area network (WLAN) measurement configuration comprises a storage unit for storing instructions and a processing means coupled to the storage unit. The processing means is configured to execute the instructions stored in the storage unit. The instructions comprise establishing a connection to a base station (BS) of a cellular network; receiving the WLAN measurement configuration on the connection from the BS; performing WLAN measurement on a WLAN according to the WLAN measurement configuration; transmitting a first WLAN measurement result of the WLAN measurement to the BS on the connection according to the WLAN measurement configuration; receiving a cellular-WLAN aggregation (CWA) configuration on the connection from the BS; communicating a plurality of packets with the WLAN according to the CWA configuration; keeping the WLAN measurement configuration, when detecting a connection failure on the WLAN; and keeping the WLAN measurement configuration, when detecting a connection failure on the cellular network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
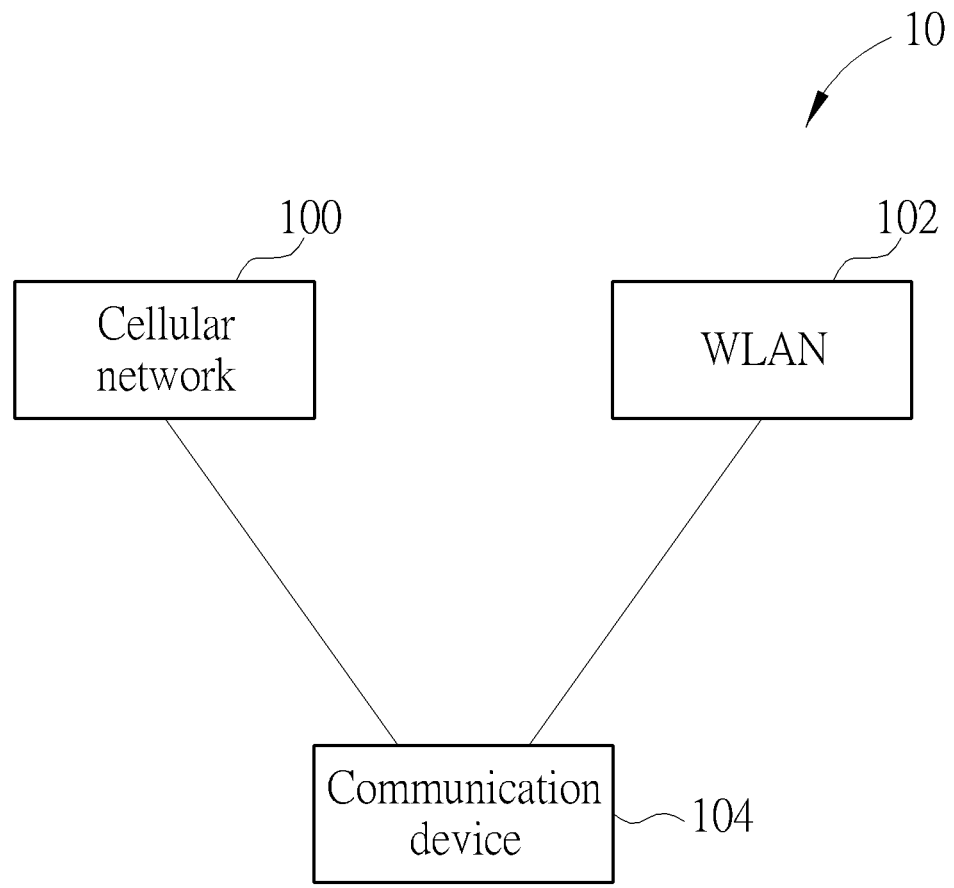
FIG. 1 is a schematic diagram of a wireless communication system according to an example of the present invention.

FIG. 1 is a schematic diagram of a wireless communication system 10 according to an example of the present invention. The wireless communication system 10 is briefly composed of a cellular network 100, a wireless local area network (WLAN) 102 and a communication device 104. Practically, the cellular network 100 may be an evolved UTRAN (E-UTRAN) comprising at least one evolved NB (eNB) and/or at least one relay. In another example, the cellular network 100 may be a fifth generation (5G) network including at least one 5G eNB which employs orthogonal frequency-division multiplexing (OFDM) and/or non-OFDM on a wider carrier frequency, and a transmission time interval (TTI) for communicating with the communication devices is smaller than 1 millisecond (ms). In general, a base station (BS) is used to refer any of the eNB and the 5G eNB. In one example, a WiFi standard operated by the WLAN may include 802.11ax, 802.11ad, 802.11ac, 802.11n, 802.11g, 802.11b and 802.11a operated in 2.4 GHz, 5 GHz or 60 GHz band.

The communication device 104 can be a user equipment (UE), a mobile phone, a laptop, a tablet computer, an electronic book, a portable computer system, a vehicle or aircraft. In addition, the cellular network 100 and the communication device 104 can be seen as a transmitter or a receiver according to direction (i.e., transmission direction), e.g., for an uplink (UL), the communication device 104 is the transmitter and the cellular network 100 (or the WLAN 102) is the receiver, and for a downlink (DL), the cellular network 100 (or the WLAN 102) is the transmitter and the communication device 104 is the receiver.

Figure 2:
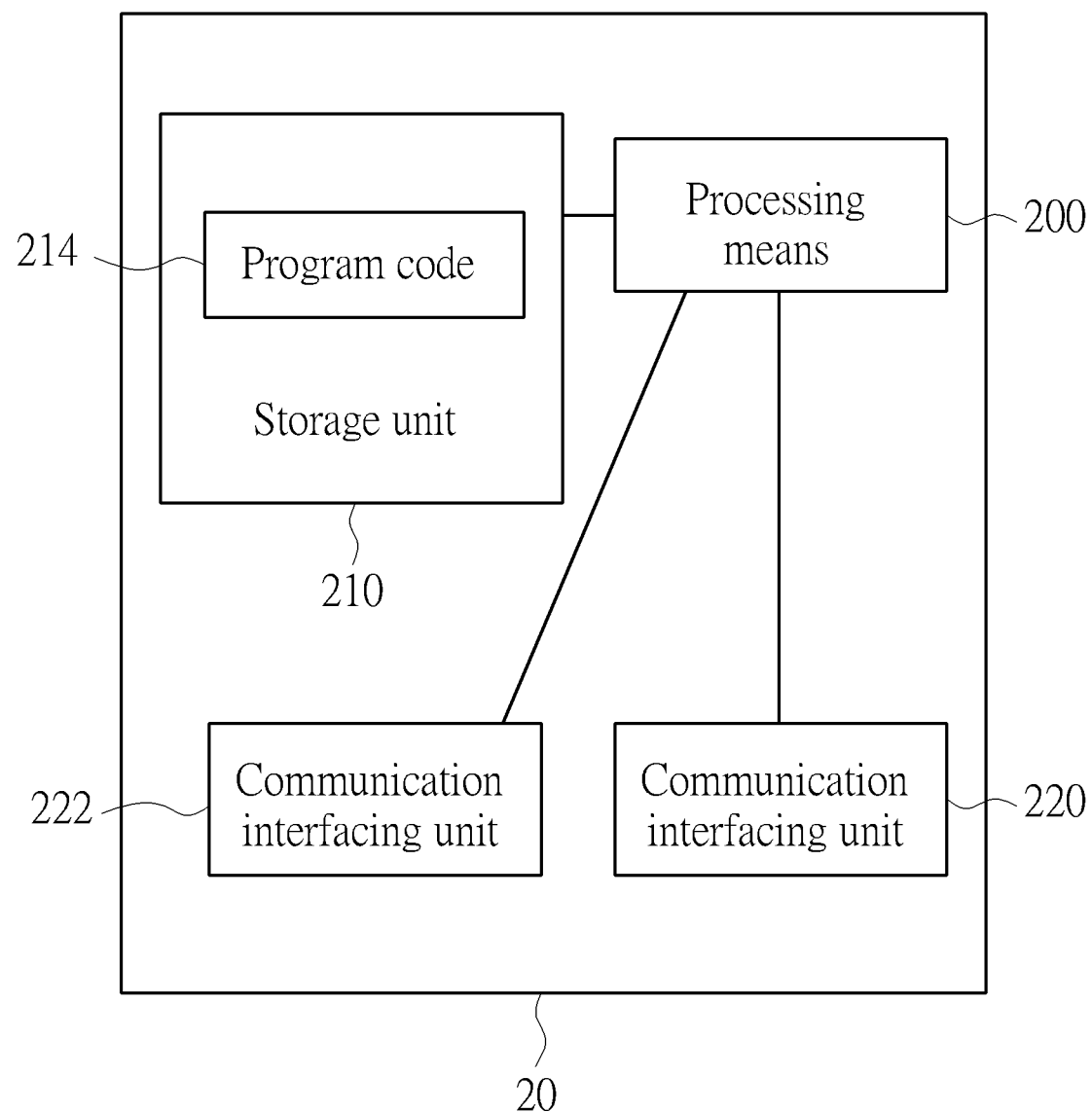
FIG. 2 is a schematic diagram of a communication device according to an example of the present invention.

FIG. 2 is a schematic diagram of a communication device 20 according to an example of the present invention. The communication device 20 may be the communication device 104, the cellular network 100 or the WLAN 102 shown in FIG. 1, but is not limited herein. The communication device 20 may include a processing means 200 such as a microprocessor or Application Specific Integrated Circuit (ASIC), a storage unit 210, a communication interfacing unit 220 for long term evolution (LTE)/5G transmission/reception, and a communication interfacing unit 222 for WLAN (e.g., WiFi) transmission/reception. The storage unit 210 may be any data storage device that may store a program code 214, accessed and executed by the processing means 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

In the following embodiments, a UE is used to represent the communication device 104 in FIG. 1.

Figure 3:
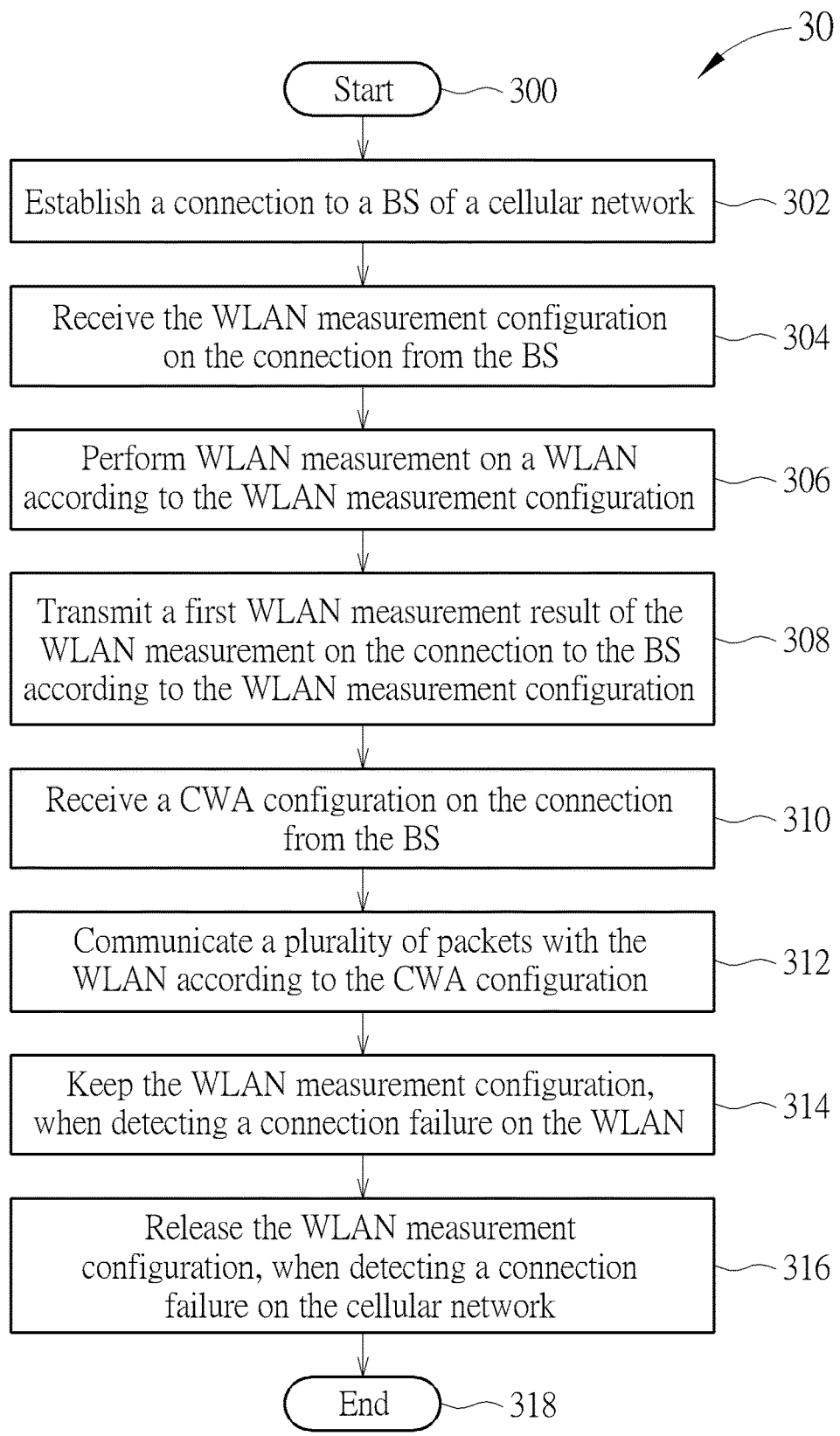
FIG. 3 is a flowchart of a process according to an example of the present invention.

FIG. 3 is a flowchart of a process 30 according to an example of the present invention. The process 30 may be utilized in a UE, to handle a WLAN measurement configuration. The process 30 includes the following steps:

Step 300: Start.

Step 302: Establish a connection to a BS of a cellular network.

Step 304: Receive the WLAN measurement configuration on the connection from the BS.

Step 306: Perform WLAN measurement on a WLAN according to the WLAN measurement configuration.

Step 308: Transmit a first WLAN measurement result of the WLAN measurement on the connection to the BS according to the WLAN measurement configuration.

Step 310: Receive a cellular-WLAN aggregation (CWA) configuration on the connection from the BS.

Step 312: Communicate a plurality of packets with the WLAN according to the CWA configuration.

Step 314: Keep the WLAN measurement configuration, when detecting a connection failure on the WLAN.

Step 316: Release the WLAN measurement configuration, when detecting a connection failure on the cellular network.

Step 318: End.

According to the process 30, the UE establishes a connection to a BS of a cellular network, and receives the WLAN measurement configuration on the connection from the BS. Then, the UE performs WLAN measurement on a WLAN according to the WLAN measurement configuration, and transmits a first WLAN measurement result of the WLAN measurement on the connection to the BS according to the WLAN measurement configuration. Further, the UE receives a CWA configuration on the connection from the BS, and communicates a plurality of packets with the WLAN according to the CWA configuration. Further, the UE keeps the WLAN measurement configuration, when (e.g., in response to) detecting a connection failure on the WLAN (e.g., a WiFi connection is lost). The UE releases the WLAN measurement configuration, when (e.g., in response to) detecting a connection failure on the cellular network (e.g., an LTE radio link failure (RLF)).

Realization of the process 30 is not limited to the above description. The following examples are used for illustrating the process 30.

In one example, the connection includes a radio link connecting the UE and a cell of the BS. In one example, the connection includes a radio resource control (RRC) connection with the BS and the UE establishes the connection by a RRC connection establishment procedure or a handover procedure. The connection may further have at least one radio bearer configured by the cellular network. The cellular network may be a LTE or 5G network. In one example, the WLAN measurement configuration includes at least one of an identifier of the WLAN, a channel number, band information (e.g. 2.4 GHz, 5 GHz or 60 GHz), a measurement or reporting metric, a measurement method and a reporting configuration. In one example, the UE searches or measures the WLAN periodically according to a period. The period is indicated by the measurement method, or determined by the UE if the WLAN measurement configuration does not include the measurement method. The band information indicates a frequency band of the WLAN and the channel number indicates a channel of the WLAN. In one example, the UE tries to detect the WLAN in the band indicated by the band information or on a carrier indicated by the channel number, if the WLAN measurement configuration includes the band information or the channel number. In another example, the UE tries to detect the WLAN on any carrier, if the WLAN measurement configuration neither includes the band information nor the channel number. If the UE visited the WLAN before, the UE may store a channel number or band information of the WLAN and try to detect the WLAN according to the stored channel number or band information.

In one example, the UE transmits the first WLAN measurement result to the BS according to the reporting configuration. The reporting configuration includes a reporting event or a reporting period. In one example, the first WLAN measurement result indicates a signal strength or quality of the WLAN. The signal strength or quality is good or larger (e.g., stronger or better) than a threshold. Accordingly, the BS transmits the CWA configuration on the connection to the UE in response to the first WLAN measurement result. In one example, the UE transmits the plurality of packets to the WLAN or receives the plurality of packets from the WLAN, to perform the CWA. In another example, the UE transmits a second WLAN measurement result indicating a signal strength or quality of the WLAN when communicating with the WLAN for the CWA.

In one example, a signal strength or quality of the WLAN becomes weak, when the UE is moving away from the WLAN. In another example, the UE is not able to receive a beacon of the WLAN suddenly due to fading. The UE detects the connection failure on the WLAN in the two examples according to at least one of following criteria or condition. In one example, the UE detects the connection failure on the WLAN, when the UE detects that a signal strength (e.g., of a beacon) or quality of the WLAN is less (e.g., weaker) than a threshold. In another example, the UE detects the connection failure on the WLAN, when the UE does not detect any beacon (e.g., a beacon of the WLAN). Thus, the UE suspends transmission to the WLAN. The UE may transmit a third WLAN measurement result indicating the signal strength or quality or indicating the connection failure on the WLAN on the connection to the BS, such that the BS may suspend transmission of a plurality of packets to the UE via the WLAN. According to the process 30, the UE keeps the WLAN measurement configuration while connecting to the cellular network, when detecting the connection failure on the WLAN. Then, the UE may detect the WLAN again, after detecting the connection failure on the WLAN. Further, the UE transmits a fourth WLAN measurement result on the connection to the BS according to the WLAN measurement configuration, after (e.g., when) detecting the WLAN again. The fourth WLAN measurement result indicates the signal strength or quality of the WLAN which becomes good. Thus, the BS may resume transmission of a plurality of packets to the UE via the WLAN.

In one example, the WLAN measurement configuration is included in a first RRC message (e.g. RRCConnectionReconfiguration), and the CWA configuration is included in a second RRC message. In one example, the second RRC message is an RRCConnectionReconfiguration message including the identifier of the WLAN for the CWA.

In one example, the UE performs a connection recovery procedure (e.g. RRC connection reestablishment procedure) with the cellular network, after (e.g., when) detecting the connection failure on the cellular network (e.g., an LTE RLF). Further, the UE releases the WLAN measurement configuration in response to the connection failure on the cellular network or in response to the RRC connection reestablishment procedure. Accordingly, the UE does not transmit any WLAN measurement result to the BS according to the WLAN measurement configuration. In one example, the BS releases the WLAN measurement configuration in a context of the UE stored in the BS, in response to an RRCConnectionReestablishmentRequest message of the RRC connection reestablishment procedure received from the UE.

In one example, the UE releases the WLAN measurement configuration, when selecting (e.g., connecting to) another WLAN not being configured by the BS for the CWA. More specifically, the UE selects (e.g., connect to) the said other WLAN having a different identifier from the identifier of the WLAN, during searching the WLAN after detecting the connection failure on the WLAN. Further, the UE indicates it connects to the said other WLAN to the BS. Accordingly, the BS releases the WLAN measurement configuration in the context of the UE, when receiving the indication.

In one example, the WLAN measurement configuration includes a detecting configuration for detecting the WLAN. In one example, the detecting configuration includes a plurality of LTE/5G cell identities (e.g., physical cell identities (PCIs)) of (e.g., corresponding to) a plurality of LTE/5G cells. The UE determines to detect the WLAN, when the UE detects the plurality of LTE/5G cell identities. In one example, the detecting configuration further includes a LTE/5G carrier frequency of the plurality of LTE/5G cell identities. When the measurement configuration does not include the detecting configuration, the UE may have the plurality of LTE/5G cell identities if the UE detected the WLAN before.

Figure 4:
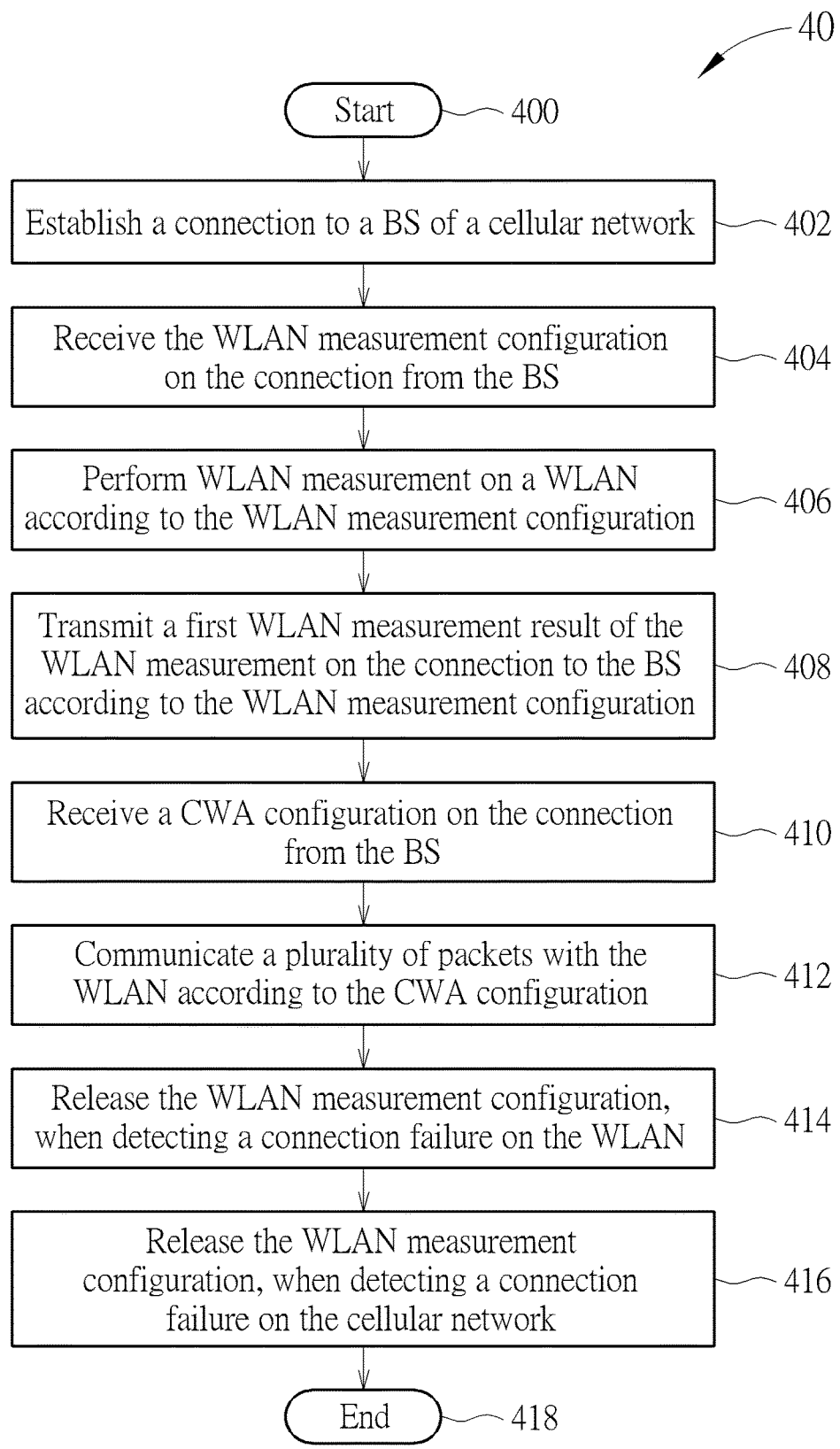
FIG. 4 is a flowchart of a process according to an example of the present invention.

FIG. 4 is a flowchart of a process 40 according to an example of the present invention. The process 40 may be utilized in a UE, to handle a WLAN measurement configuration. The process 40 includes the following steps:

Step 400: Start.

Step 402: Establish a connection to a BS of a cellular network.

Step 404: Receive the WLAN measurement configuration on the connection from the BS.

Step 406: Perform WLAN measurement on a WLAN according to the WLAN measurement configuration.

Step 408: Transmit a first WLAN measurement result of the WLAN measurement on the connection to the BS according to the WLAN measurement configuration.

Step 410: Receive a CWA configuration on the connection from the BS.

Step 412: Communicate a plurality of packets with the WLAN according to the CWA configuration.

Step 414: Release the WLAN measurement configuration, when detecting a connection failure on the WLAN.

Step 416: Release the WLAN measurement configuration, when detecting a connection failure on the cellular network.

Step 418: End.

According to the process 40, the UE establishes a connection to a BS of a cellular network, and receives the WLAN measurement configuration on the connection from the BS. Then, the UE performs WLAN measurement on a WLAN according to the WLAN measurement configuration, and transmits a first WLAN measurement result of the WLAN measurement on the connection to the BS according to the WLAN measurement configuration. Further, the UE receives a CWA configuration on the connection from the BS, and communicate a plurality of packets with the WLAN according to the CWA configuration. Further, the UE releases the WLAN measurement configuration, when (e.g., in response to) detecting a connection failure on the WLAN (e.g., a WiFi connection is lost). The UE releases the WLAN measurement configuration, when (e.g., in response to) detecting a connection failure on the cellular network (e.g., an LTE RLF).

Realization of the process 40 is not limited to the above description. The following examples are used for illustrating the process 40.

The Process 40 is similar to the process 30 except that the UE may release the WLAN measurement configuration, if the connection failure on the WLAN network occurs. Thus, the UE may not need to perform the WLAN measurement and the reporting, and a battery power of the UE is saved.

In one example, the UE transmits an indication on the connection to the BS, when detecting the connection failure on the WLAN or when selecting another WLAN. Accordingly, the BS may release the WLAN measurement configuration in a context of the UE stored in the BS, when receiving the indication. Further, the BS may transmit another WLAN measurement configuration to the UE in response to the indication. The said other WLAN measurement configuration may include an identifier of the other WLAN for the UE to detect and measure the other WLAN.

Figure 5:
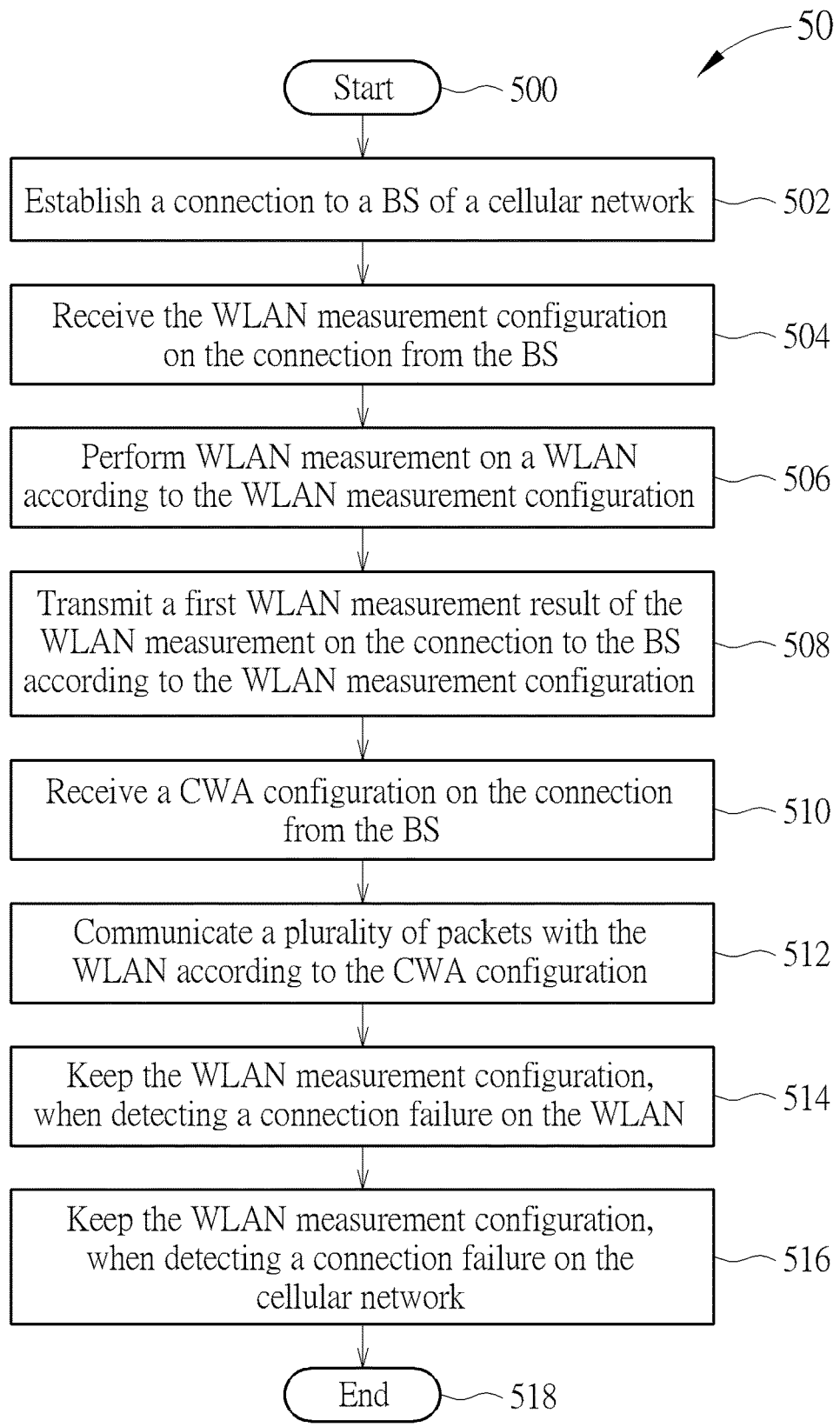
FIG. 5 is a flowchart of a process according to an example of the present invention.

FIG. 5 is a flowchart of a process 50 according to an example of the present invention. The process 50 may be utilized in a UE, to handle a WLAN measurement configuration. The process 50 includes the following steps:

Step 500: Start.

Step 502: Establish a connection to a BS of a cellular network.

Step 504: Receive the WLAN measurement configuration on the connection from the BS.

Step 506: Perform WLAN measurement on a WLAN according to the WLAN measurement configuration.

Step 508: Transmit a first WLAN measurement result of the WLAN measurement on the connection to the BS according to the WLAN measurement configuration.

Step 510: Receive a CWA configuration on the connection from the BS.

Step 512: Communicate a plurality of packets with the WLAN according to the CWA configuration.

Step 514: Keep the WLAN measurement configuration, when detecting a connection failure on the WLAN.

Step 516: Keep the WLAN measurement configuration, when detecting a connection failure on the cellular network.

Step 518: End.

According to the process 50, the UE establishes a connection to a BS of a cellular network, and receives the WLAN measurement configuration on the connection from the BS. Then, the UE performs WLAN measurement on a WLAN according to the WLAN measurement configuration, and transmits a first WLAN measurement result of the WLAN measurement on the connection to the BS according to the WLAN measurement configuration. Further, the UE receives a CWA configuration on the connection from the BS, and communicates a plurality of packets with the WLAN according to the CWA configuration. Further, the UE keeps the WLAN measurement configuration according to the WLAN measurement configuration, when (e.g., in response to) detecting a connection failure on the WLAN (e.g., a WiFi connection is lost). The UE keeps the WLAN measurement configuration, when (e.g., in response to) detecting a connection failure on the cellular network (e.g., an LTE RLF).

Realization of the process 50 is not limited to the above description. The following examples are used for illustrating the process 50.

The process 50 is similar to the process 30 except that the UE may keep (e.g., maintain) the WLAN measurement configuration, if the connection failure on the cellular network occurs. Comparing with the process 30, an advantage of the process 50 is that when the UE recovers the connection failure on the cellular network with the cellular network (e.g. the BS or another BS), the cellular network does not need to configure the WLAN measurement configuration to the UE. The UE performs a connection recovery procedure (e.g. RRC connection reestablishment procedure) with the cellular network to recover the connection failure on the cellular network. In one example, the UE may perform the WLAN measurement and transmit a fifth WLAN measurement result on the connection to the cellular network according to the WLAN measurement configuration, after the UE recovers the connection failure on the cellular network. If the CWA is released by the UE due to the connection failure on the cellular network (e.g., the LTE RUE) or the connection recovery procedure, the cellular network may configure the CWA according to (e.g., in response to) the fifth WLAN measurement result quickly when a signal strength or quality of the WLAN in the fifth WLAN measurement result is good. The cellular network keeps (e.g., maintain) the WLAN measurement configuration in a context of the UE as well in response to the RRC connection reestablishment.

Realization of any of the processes 30-50 is not limited to the above description.

In one example, the packet above may be an internet protocol packet, a Convergence Protocol (PDCP) protocol data unit (PDU), a radio link control (RLC) PDU or a medium access control (MAC) PDU for LTE or 5G communication. In another example, the packet above is a newly defined PDU for CWA.

In one example, the UE measures a beacon of the WLAN to get the signal strength or quality of the WLAN.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling the WLAN measurement configuration. Thus, the UE is able to handle the WLAN measurement configuration in response to the connection failure on the WLAN and/or the connection failure on the cellular network. As a result, the problem of handling the WLAN measurement configuration is solved.

Those skilled in the art will readily observe that numerous modifications and alterations of the device and method be made while retaining the teachings of the invention. Accordingly, the above disclosure should be construed as limited only by the metes and bounds of the appended claims.

What is claimed is:

1. A communication device of handling a wireless local area network (WLAN) measurement configuration, comprising:
 a storage device; and
 a processing circuit, coupled to the storage device, wherein the storage device stores, and the processing circuit is configured to execute instructions of:
 establishing a connection to a base station (BS) of a cellular network;
 receiving the WLAN measurement configuration on the connection from the BS;
 performing WLAN measurement on a WLAN according to the WLAN measurement configuration;
 transmitting a first WLAN measurement result of the WLAN measurement on the connection to the BS according to the WLAN measurement configuration;
 receiving a cellular-WLAN aggregation (CWA) configuration on the connection from the BS;
 communicating a plurality of packets with the WLAN according to the CWA configuration;
 keeping the WLAN measurement configuration without requiring an instruction from the BS, if detecting that a connection failure on the WLAN occurs;
 releasing the WLAN measurement configuration without requiring the instruction from the BS, if detecting that a connection failure on the cellular network occurs;
 detecting the WLAN, after detecting that the connection failure on the WLAN occurs; and transmitting a second WLAN measurement result on the connection to the BS according to the WLAN measurement configuration, after detecting the WLAN;

wherein the communication device is a user equipment.

2. The communication device of claim 1, wherein the WLAN measurement configuration includes at least one of an identifier of the WLAN, a channel number, band information, a measurement or reporting metric, a measurement method and a reporting configuration.

3. The communication device of claim 2, wherein the measurement method indicates a period for the user equipment to search or measure the WLAN periodically.

4. The communication device of claim 2, wherein the band information indicates a frequency band of the WLAN.

5. The communication device of claim 1, wherein the first WLAN measurement result indicates a signal strength or quality of the WLAN.

6. The communication device of claim 1, wherein the instruction of detecting that the connection failure on the WLAN occurs comprises:
   detecting that a signal strength or quality of the WLAN is less than a threshold; or
   not detecting any beacon.

7. The communication device of claim 1, wherein the WLAN measurement configuration is included in a first radio resource control (RRC) message, and the CWA configuration is included in a second RRC message.

8. The communication device of claim 1, wherein the instructions further comprise:
   performing a connection recovery procedure with the cellular network, after detecting that the connection failure on the cellular network occurs.

9. The communication device of claim 1, wherein the instructions further comprise:
   releasing the WLAN measurement configuration, when selecting another WLAN not being configured by the BS for the CWA.

10. The communication device of claim 1, wherein the instructions further comprise:
    determining to detect the WLAN, when detecting a plurality of long term evolution (LTE)/fifth generation (5G) cell identities of a plurality of LTE/5G cells;
    wherein the plurality of LTE/5G cell identities are included in a detecting configuration for detecting the WLAN, and the detecting configuration is included in the WLAN measurement configuration.

11. A communication device of handling a wireless local area network (WLAN) measurement configuration, comprising:
    a storage device; and
    a processing circuit, coupled to the storage device, wherein the storage device stores, and the processing circuit is configured to execute instructions of:
    establishing a connection to a base station (BS) of a cellular network;
    receiving the WLAN measurement configuration on the connection from the BS;
    performing WLAN measurement on a WLAN according to the WLAN measurement configuration;
    transmitting a first WLAN measurement result of the WLAN measurement on the connection to the BS according to the WLAN measurement configuration;
    receiving a cellular-WLAN aggregation (CWA) configuration on the connection from the BS;
    communicating a plurality of packets with the WLAN according to the CWA configuration;
    releasing the WLAN measurement configuration without requiring an instruction from the BS, if detecting that a connection failure on the WLAN occurs;
    releasing the WLAN measurement configuration without requiring the instruction from the BS, if detecting that a connection failure on the cellular network occurs; and
    transmitting an indication on the connection to the BS, when selecting another WLAN;
    wherein the communication device is a user equipment.

12. The communication device of claim 11, wherein the instructions further comprise:
    transmitting an indication on the connection to the BS, if detecting that the connection failure on the WLAN occurs.

13. A communication device of handling a wireless local area network (WLAN) measurement configuration, comprising:
    a storage device; and
    a processing circuit, coupled to the storage device, wherein the storage device stores, and the processing circuit is configured to execute instructions of:
    establishing a connection to a base station (BS) of a cellular network;
    receiving the WLAN measurement configuration on the connection from the BS;
    performing WLAN measurement on a WLAN according to the WLAN measurement configuration;
    transmitting a first WLAN measurement result of the WLAN measurement to the BS on the connection according to the WLAN measurement configuration;
    receiving a cellular-WLAN aggregation (CWA) configuration on the connection from the BS;
    communicating a plurality of packets with the WLAN according to the CWA configuration;
    keeping the WLAN measurement configuration without requiring an instruction from the BS, if detecting that a connection failure on the WLAN occurs;
    and keeping the WLAN measurement configuration without requiring the instruction from the BS, if detecting that a connection failure on the cellular network occurs;
    wherein the WLAN measurement configuration comprises at least one of an identifier of the WLAN, a channel number, band information, a measurement or reporting metric, a measurement method and a reporting configuration;
    wherein the communication device is a user equipment.

* * * * *